US007437166B2

(12) United States Patent
Osseiran et al.

(10) Patent No.: US 7,437,166 B2
(45) Date of Patent: Oct. 14, 2008

(54) REDUCING SHARED DOWNLINK RADIO CHANNEL INTERFERENCE BY TRANSMITTING TO MULTIPLE MOBILES USING MULTIPLE ANTENNA BEAMS

(75) Inventors: Afif Osseiran, Kista (SE); Andrew Logothetis, Uppsala (SE); Marten Ericson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 731 days.

(21) Appl. No.: 10/668,363

(22) Filed: Sep. 24, 2003

(65) Prior Publication Data

US 2005/0064872 A1 Mar. 24, 2005

(51) Int. Cl.
*H04Q 7/20* (2006.01)
(52) U.S. Cl. ............... 455/452.1; 455/562.1; 455/575.7
(58) Field of Classification Search ............. 455/452.1, 455/562.1, 575.7
See application file for complete search history.

(56) References Cited

U.S. PATENT DOCUMENTS

| 5,751,704 | A * | 5/1998 | Kostic et al. ............... 370/335 |
| 5,914,946 | A * | 6/1999 | Avidor et al. ............... 370/336 |
| 6,928,296 | B2 * | 8/2005 | Kanemoto et al. ........... 455/522 |
| 6,996,418 | B2 * | 2/2006 | Teo et al. ................. 455/562.1 |
| 7,020,110 | B2 * | 3/2006 | Walton et al. ............... 370/334 |
| 2002/0086708 | A1 * | 7/2002 | Teo et al. ..................... 455/561 |
| 2002/0137485 | A1 * | 9/2002 | Nilsson et al. ............ 455/184.1 |
| 2003/0045288 | A1 * | 3/2003 | Luschi et al. ............... 455/434 |
| 2003/0081575 | A1 | 5/2003 | Lim et al. |
| 2004/0033791 | A1 * | 2/2004 | Schmidl et al. ............. 455/137 |
| 2004/0047403 | A1 * | 3/2004 | Choi et al. ................... 375/148 |
| 2004/0063468 | A1 * | 4/2004 | Frank ........................ 455/561 |
| 2005/0181832 | A1 * | 8/2005 | Ishii et al. ................ 455/562.1 |

FOREIGN PATENT DOCUMENTS

| EP | 0841827 | 5/1998 |
| EP | 1152628 | 11/2001 |

OTHER PUBLICATIONS

Parkwall et al., The Evolution of WCDMA Towards Higher Speed Downlink Packet Data Access, Proceedings IEEE Vehicular Technology Conference Spring, Rhodes, Greece, May 2001.*

(Continued)

*Primary Examiner*—Nay Maung
*Assistant Examiner*—Tuan H Nguyen
(74) *Attorney, Agent, or Firm*—Nixon & Vanderhye P.C.

(57) ABSTRACT

A radio base station includes multiple antennas associated with a cell. Multiple mobile radios are selected to receive transmissions over a shared radio channel during a predetermined time interval. Information is transmitted over the shared radio channel to multiple mobile radios in the cell during the predetermined time interval using multiple antenna beams. As a result, interference from the transmission appears as white additive Gaussian noise in time and in space in the cell. A "flashlight effect" caused by a single beam transmission over the shared channel during a predetermined time interval that would normally detrimentally impact mobile channel quality detection is avoided. Other methods for avoiding the flashlight effect are described.

34 Claims, 10 Drawing Sheets

OTHER PUBLICATIONS

3GPP TS 25.211 V5.4.0 Jun. 2003; 3rd Generation Partnership Project: Technical Specification Group Radio Access Network; Physical channels and mapping of transport channels onto physical channels (FDD) (Release 5); pp. 1-51; Online, www.3gpp.org/ftp/Specs/html-info/25211.htm.

International Search Report and Written Opinion mailed Feb. 18, 2005 in corresponding PCT Application PCT/SE2004/001218.

Parkvall et al., The Evolution of WCDMA Towards Higher Speed Downlink Packet Data Access, Proceedings IEEE Vehicular Technology Conference Spring, Rhodes, Greece, May 2001.

Holtzman, CDMA Forward Link Waterfilling Power Control, Proceedings IEEE Vehicular Technology Conference, Spring, Tokyo, Japan, Jun. 2000.

3rd Generation Partnership Project; Technical Specification Group Radio Access Network, High Speed Downlink Packet Access, Physical Layer Aspects, Release 5, 3GPP TR 25.858 V5.0.0 (Mar. 2002), pp. 1-31.

3rd Generation Partnership Project; Technical Specification Group Radio Access Network, High Speed Downlink Packet Access, Overall Description, Stage 2, Release 5, 3GPP TS 25.308 V5.4.0 (Mar. 2003), pp. 1-29.

* cited by examiner

REDUCING SHARED DOWNLINK RADIO CHANNEL INTERFERENCE BY TRANSMITTING TO MULTIPLE MOBILES USING MULTIPLE ANTENNA BEAMS

BACKGROUND AND SUMMARY OF THE INVENTION

The present invention relates to cellular radio communications, and more particularly, to downlink radio transmission where multiple antennas are employed at the radio base station.

Shared downlink radio channels, like the high speed-downlink shared channel (HS-DSCH) employed in third generation, wideband code division multiple access (WCDMA) systems, offer high data transmission rates, reduced round-trip delays, and high capacity, at least with respect to a typical transport channel. The HS-DSCH supports higher order modulation to achieve higher user and system throughput, fast link adaptation that takes into account the instantaneous quality of the radio propagation environment and adapts the coding and modulation scheme accordingly, and hybrid-ARQ with soft combining to decrease retransmissions and thereby reduce delay.

HS-DSCH mobile radio users periodically measure the instantaneous radio channel quality of a pilot channel broadcast by a radio base station, which is called Node B in the WCDMA specification. The mobile users periodically report a channel quality indicator (CQI) based upon the measured radio channel transmission. The base station responsible for handling the HS-DSCH uses the CQI to assign an appropriate coding and modulation scheme. It may also use the CQI to decide which mobile radio should be scheduled to receive downlink transmission over the HS-DSCH. Various scheduling strategies can be used for transmitting over the high speed shared channel.

There is an inherent time delay between the time instant when a mobile user reports the CQI and the time instant that the base station schedules transmission over the high speed shared channel to a mobile user. During this time delay, the interference may change dramatically for reasons described below. If the difference between the reported channel quality and the actual channel quality at the time of scheduling is large, the selected coding and modulation scheme may not be sufficiently robust to ensure transmission with a low enough error rate. If the data is received in error, the mobile radio requests retransmission which degrades system performance.

This difference between a reported CQI and the actual CQI at the scheduled HS-DSCH transmission is particularly problematic in adaptive antenna systems. An adaptive antenna system can change its beam characteristics in response to changes in the network. An antenna beam is any signal transmission deliberately covering only part of a cell. A cell is a coverage area of the base station. Because the base station can detect the direction of a mobile station, it can transmit dedicated information in an antenna beam towards the desired mobile station. By directing the signal just toward its recipient, the interference in the network can be substantially reduced. Adaptive antennas can significantly increase the data capacity in a cellular radio network.

Figure 1:
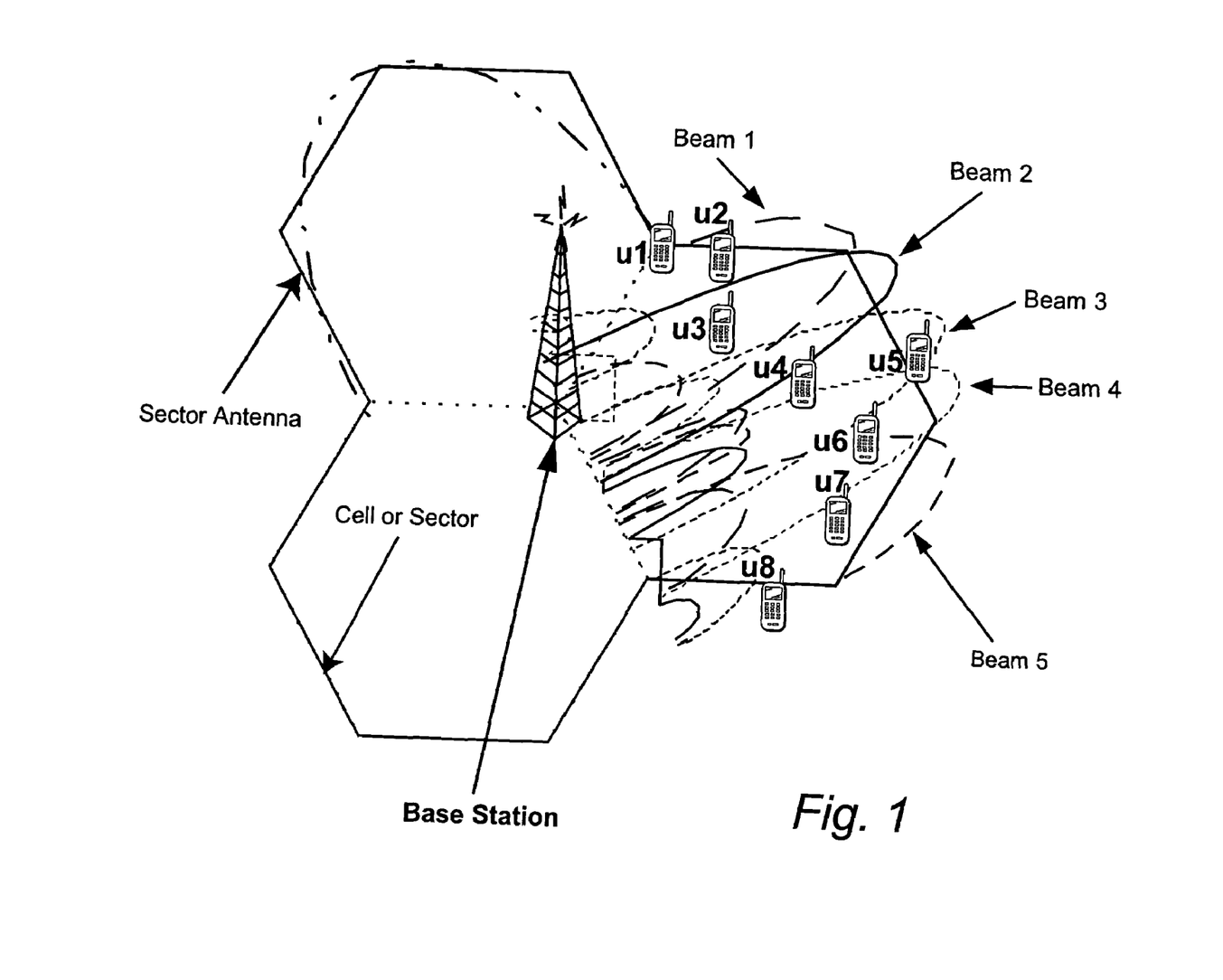
FIG. 1 illustrates a cellular communications system with a base station serving three sector cells.

The discrepancy between the reported channel quality and the instantaneous channel quality caused by scheduling different mobile users to receive transmissions over a shared radio channel may be traced in large part to a "flashlight effect." The flashlight effect will be described in conjunction with FIGS. 1, 2, 3, and 4. FIG. 1 illustrates a base station with three cells or sectors. In the upper, left-hand sector cell, the base station transmits a sector antenna beam which covers most of that sector cell. An adaptive antenna array in the right-most sector cell transmits five, relatively narrow antenna beams 1-5. Most antenna patterns contain a main lobe and several minor lobes commonly known as side lobes. The term "beam" refers to the main lobe. Eight mobile radios, (a mobile radio is referred to in WCDMA as a user equipment (UE)), are shown in or close to the right-most sector cell and are identified as U1-U8.

Figure 2:
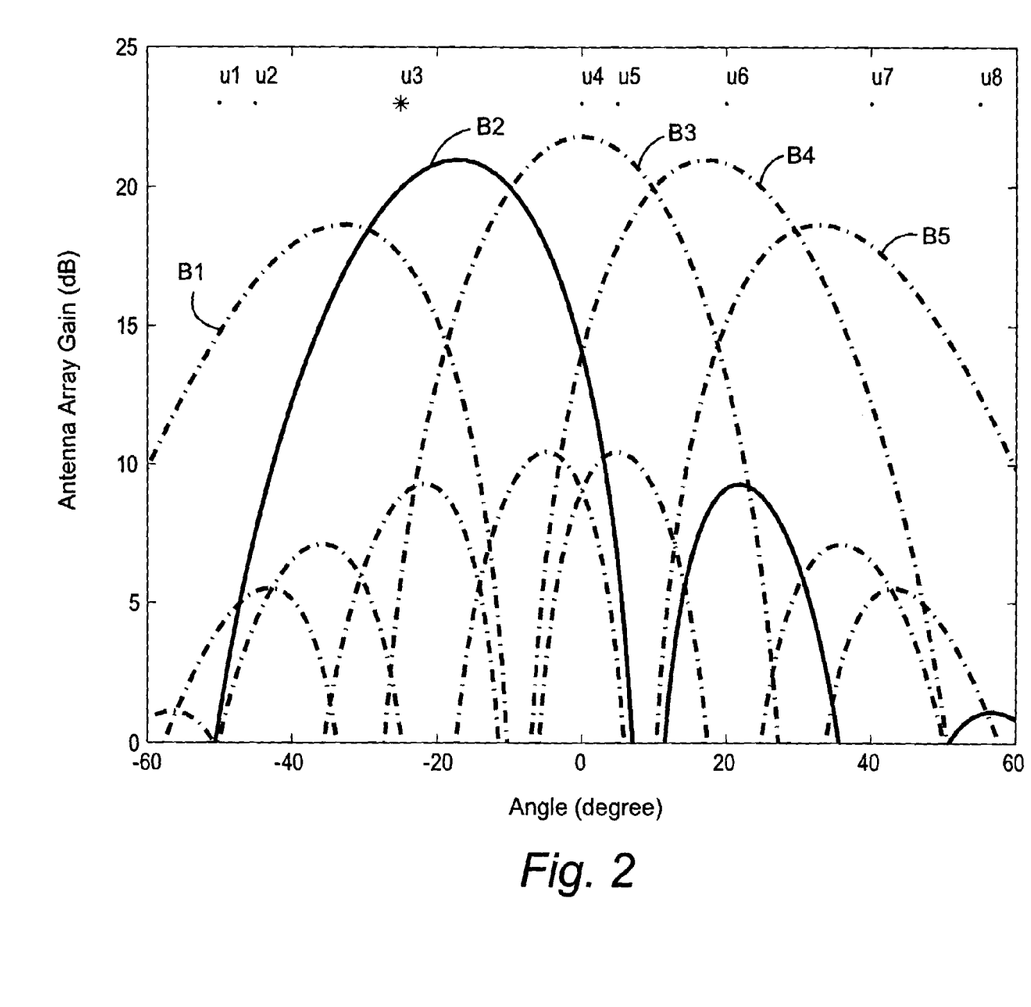
FIG. 2 illustrates antenna beam patterns for an HS-DSCH transmission during one time interval.

FIG. 2 illustrates an example situation where mobile radio U3 is scheduled for a current time instant to receive information over the high-speed downlink shared channel with maximum power. This is illustrated by the main and side lobes of beam B2 being represented in a bold solid line, with the remaining four beams B1, B3, B4, B5 carrying little or no power during this scheduled time period. By the end of the scheduled time period, all mobile radios, including the scheduled mobile radio U3, report to the base station their current or instantaneous detected channel quality indicator (CQI) based on the quality of reception of the base station's pilot signal. The base station transmits information to the next-scheduled mobile radio over the HS-DSCH channel at maximum power during the next scheduling time period.

Figure 3:
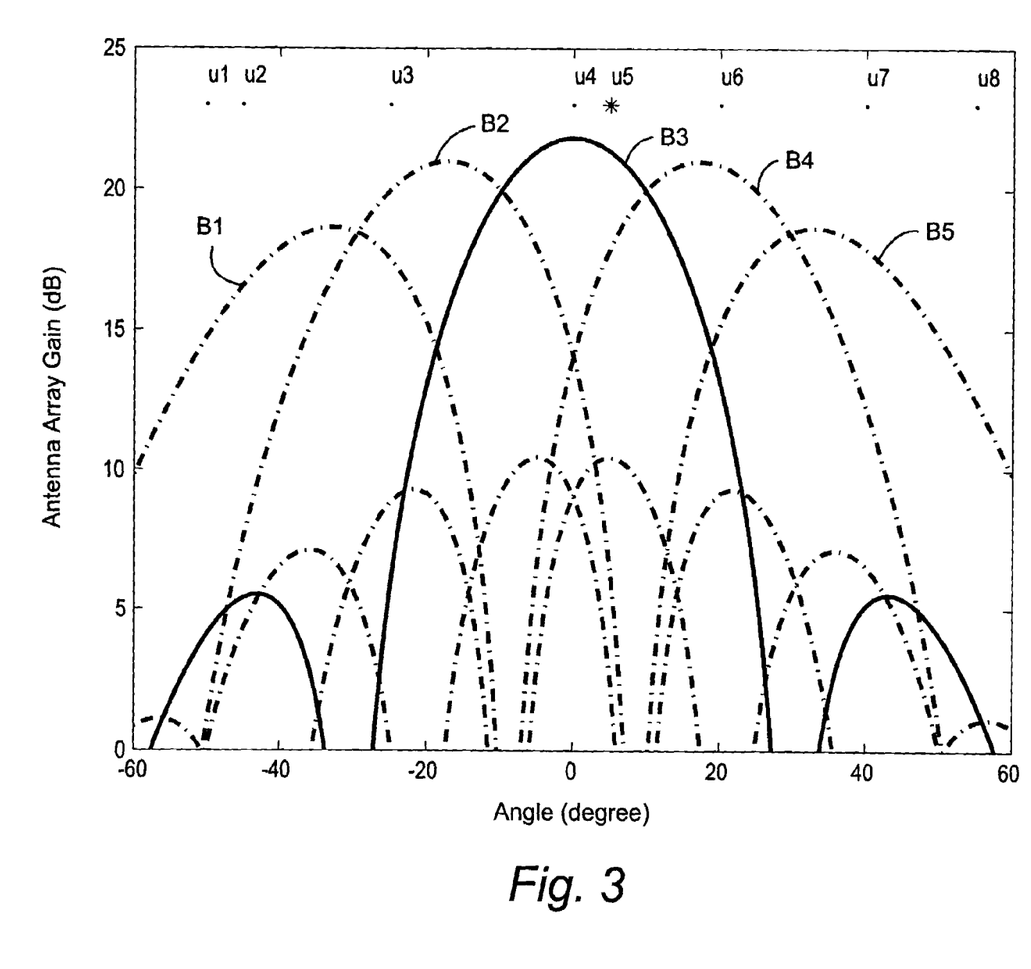
FIG. 3 illustrates an antenna beam pattern for transmission over an HS-DSCH channel during a subsequent transmission time interval.

In the example shown in FIG. 3, the next-scheduled mobile radio is U5 because at the time the scheduling decision was made, U5 had the highest CQI. Beam 3 B3, which encompasses mobile U5, is selected based on beam quality information detected at the base station. At the time instant shown FIG. 2, mobile radio U5 is at a "null" between the main lobe of beam B2 and a side lobe of beam B2. That null means U5 experiences low interference from the beam B2 transmission. On the other hand, mobile radio U4, which is relatively close to mobile radio U5, reports a much lower CQI because the main lobe of beam B2 creates a high interference at U4 on the order of 15 dB. Since mobile U4 is relatively close to the scheduled mobile U3, it is "blasted" by beam B2 and therefore reports a dramatically lower CQI than mobile U5. Yet, in the absence of the beam B2, the reported CQI from both mobiles U4 and U5 would be approximately the same. These kinds of "blasts" cause the flashlight effect.

Figure 4:
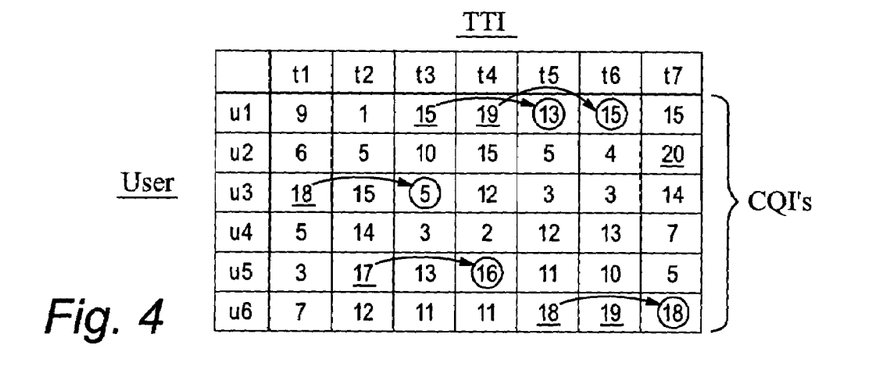
FIG. 4 is a transmission time interval table during which CQI's reported by mobile radios are used to illustrate an example of the flashlight effect.

The flashlight effect can be further illustrated using the example transmission scheduling table shown in FIG. 4. Here six mobiles U1-U6 report detected channel quality indicators (CQI) for each transmission time interval (TTI) TTI1-TTI7. The highest CQI for each TTI is underlined, and the scheduled mobile user for each TTI is circled. In this example, it takes two TTIs for the mobile user with the highest CQI to be scheduled for transmission over the HS-DSCH channel.

The table illustrates that the scheduled mobile radio does not always have the highest CQI during its scheduled TTI. For example, mobile U1 is scheduled to receive a transmission during TTI 5. Mobile U2, which is served by the same beam B1 as mobile U1, reports a very low CQI of 5 during TTI 5 because it is being temporarily "blasted" by the beam B1 transmission to mobile user U1. As a result, mobile U6 reports the highest CQI and is scheduled for TTI 7. Absent the flashlight effect of transmitting to mobile U1 during TTI 5, mobile U2 would have reported a much higher CQI. Indeed, after the flashlight effect of the beam B1 transmission during TTI's 5 and 6 subsides, mobile U2 reports a channel quality of 20, which is higher than the CQI of 18 reported by the scheduled mobile U6. The rapid and dramatic CQI increase from 4 to 20 for mobile U2 between TTI 6 and TTI 7 demonstrates the flashlight effect of beam B1 on mobile U2. This dramatic and rapid change of reported CQI from one scheduled time interval to the next is the flashlight effect.

In summary, the flashlight effect is intense interference detected by a mobile causing that mobile to report a low CQI for a short time period which results from the mobile being "flashed" by a brief downlink transmission to another scheduled mobile. The flashlight effect is a serious problem in fixed multi-beam systems, adaptive antenna systems, and transmit diversity systems.

The flashlight effect is overcome by selecting multiple mobile radios to receive a transmission over a shared radio channel during a predetermined transmission time interval. Information is transmitted over the shared radio channel to the multiple mobile radios using multiple antenna beams so that interference from the transmission appears as white additive Gaussian noise in time and in space in the cell. The "flashlight effect" caused by a single beam transmission over the shared channel that would detrimentally impact a mobile radio's detection of channel quality is avoided.

Mobile radios detect the channel quality of a pilot or other broadcast signal transmitted in the cell and report to the radio network. Shared channel transmissions are scheduled to multiple mobile radios for each time interval based on the received reports. One mobile radio is selected for transmission for each antenna beam based on the received reports. The information is transmitted over the shared channel using each antenna beam to each of the selected mobile radios during the predetermined time interval.

The shared radio channel radio resources are allocated to the multiple mobile radios using a resource allocation scheme. An optimal coding and modulation scheme is preferably selected for each scheduled mobile radio to achieve an acceptable error rate. Example resource allocation schemes include dividing the shared radio channel resources evenly between each selected mobile radio. The resource allocation scheme may divide the shared radio channel resources in proportion to each of the mobile radio's reported detected channel quality, e.g., in accordance with a "water pouring" distribution algorithm. Alternatively, the shared channel resources may be divided using a non-linear relationship between two or more of the following: amount of channel resources, throughput, quality of service, and detected channel quality. That relationship may be stored in a lookup table for easy application. If a change is detected in radio channel conditions, the look-up table is preferably updated.

In the situation where the radio communications system is a CDMA-based system and radio channel resources include scrambling codes, with each scrambling code having an associated channelization code tree, an example resource allocation scheme includes allocating one scrambling code to the shared radio channel. One or more different channelization codes associated with that scrambling code are allocated to each antenna beam during each predetermined time interval. Alternatively, a different scrambling code may be allocated for each antenna beam during each predetermined time interval.

The flashlight effect may be avoided by carefully planning in space and/or in time which beam is used for transmission. Another technique for avoiding the flashlight effect employs a beam transmission sequence order. Multiple mobile radios may be selected to receive a transmission over a shared radio channel using a beam transmission sequence order. Mobile users belonging to a selected beam may be scheduled. The beam selection is decided using a beam sequence number. Information is transmitted over the shared radio channel to each of the mobile radios in the cell following the beam transmission sequence order. Beam switching in accordance with the beam transmission sequence order occurs over multiple transmission time intervals so that interference from the transmission appears as white noise in time and in space.

DETAILED DESCRIPTION

The following description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer, using an application specific integrated circuit (ASIC), and/or using one or more digital signal processors (DSPs).

Figure 5:
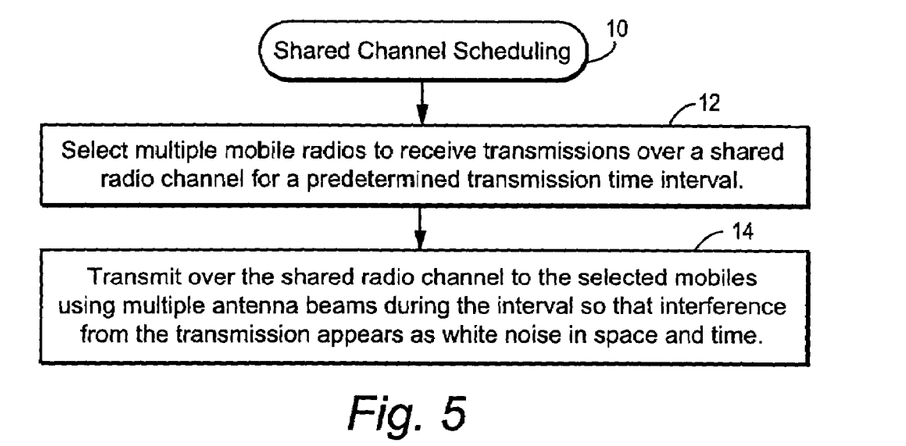
FIG. 5 is a flowchart diagram illustrating procedures for implementing one example embodiment of the present invention.

A shared channel scheduling procedure (block 10) is illustrated in flow chart form in FIG. 5. One non-limiting example of a shared radio channel is the high-speed downlink shared channel (HS-DSCH) described above. Of course, neither this description nor the invention is limited to the HS-DSCH. Multiple mobile radios are selected to receive transmissions over the shared radio channel for a predetermined transmission time interval (block 12). One mobile radio is selected to receive transmission over the shared channel per each antenna beam. Transmissions over the shared radio channel to the selected mobile radios use multiple antenna beams during that transmission time interval so that the interference caused by that shared channel transmission appears as white noise in space and time (block 14). In a preferred example embodiment, the noise is rendered white additive Gaussian noise. Stated differently, the multiple beam-to-multiple radio transmission over the shared channel ensures that intra-cell (and consequently inter-cell) interference appears spatially and temporally as white. But there is a trade-off between how many simultaneous shared-channel mobile users may be scheduled for transmission and overall system throughput. Thus, it is preferable to allocate the system resources, (e.g., power, codes, coding and modulation schemes, etc.), in an optimal way. Example resource allocation schemes are described later.

Figure 6:
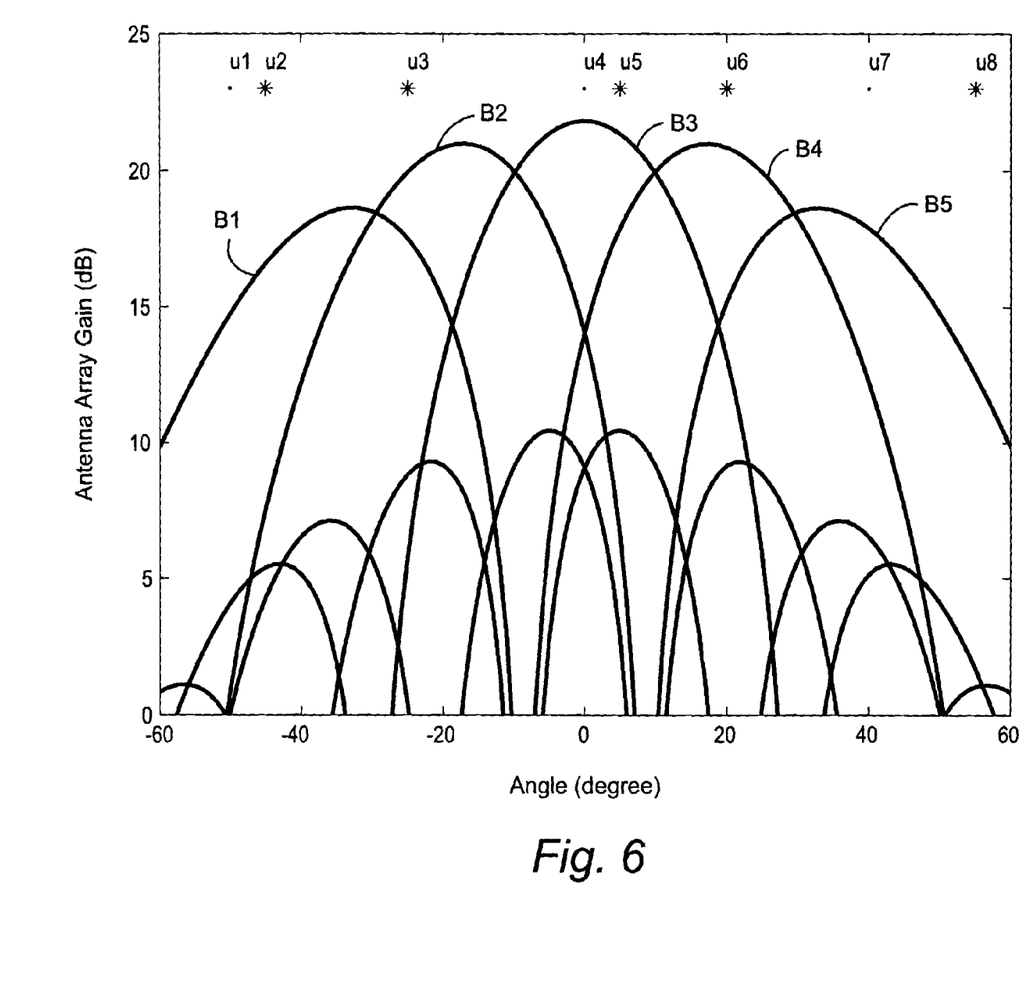
FIG. 6 is a graph illustrating an example of multiple beam transmission per transmission time interval over a shared radio channel.

FIG. 6 illustrates the multiple antenna beam transmission in one transmission time interval. Of eight mobile users U1-U8, five are selected to receive transmissions from the five beams B1-B5 during a transmission time interval over the shared radio channel. The transmission from beam B1 is directed to mobile U2; the transmission from beam B2 is directed to mobile U3; the transmission from beam B3 is directed mobile U5; the transmission from beam B4 is directed to mobile U6; and the transmission from beam B5 is directed to mobile U8.

Figure 7:
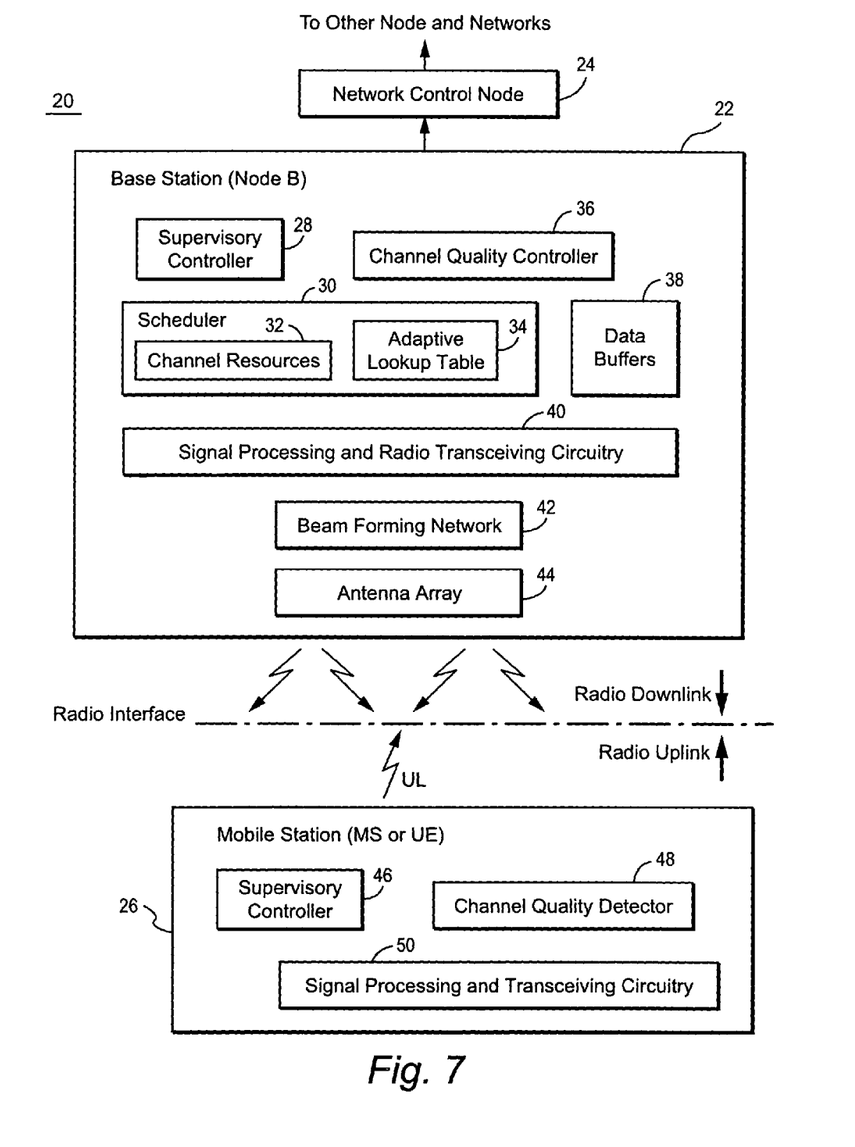
FIG. 7 illustrates an example, non-limiting radio communication system in which the present invention may be advantageously employed.

The present invention may be advantageously applied to the example, non-limiting radio communication system 20 shown in FIG. 7. A control network node 24 couples a base station 22 to other nodes and networks. In a wideband-CDMA context, such a network control node may be, for example, a radio network controller (RNC). Base station 22 includes a supervisory controller 28 for controlling the overall operation of the base station. A channel quality controller 36 collects channel quality information provided from various mobile stations 26. For example, the channel quality controller 36 may receive channel quality indicators (CQI's) from mobile stations. One or more transmit data buffers 38 store data for transmission over a shared radio channel to multiple mobile stations. A transmission scheduler 30 selects mobiles to receive transmissions that have a maximum CQI for each beam. The scheduler 30 also monitors the availability of shared radio channel resources 32 and maintains an adaptive lookup table 34. The lookup table 34 may be used in one non-limiting example to determine how shared radio channel resources may be allocated to each selected mobile for each transmission time interval. Signal processing and radio transceiving circuitry 40, a beam forming network 42, and an antenna array 44 are employed to transmit multiple antenna beams to the selected mobile users for each transmission time interval.

A mobile station 26 (sometimes referred to as a user equipment (UE) in the wide-band CDMA context) includes a supervisory controller 46 for controlling the overall operation of the mobile. It also includes a channel quality detector 48 used to detect the quality of the base station pilot channel and provide channel quality information back to the base station via the signal processing and transceiving circuitry 50. One example method is for the mobile station to measure the signal-to-noise ratio (SNR) of the received base station pilot. Knowing the average power allocated to a high speed-downlink shared packet channel (HS-DSCH), the mobile deduces the signal to noise ratio of the HS-DSCH. That HS-DSCH SNR is converted to a CQI value which is reported to the base station every transmission time interval.

The channel quality controller 36 groups received CGI reports from all shared channel mobile users into a number of groups corresponding to the number of antenna beams transmitting over the shared radio channel. This channel quality information is provided by channel quality controller 36 to the scheduler 30 which identifies the mobile radios to receive transmissions over each of the antenna beams transmitting over the shared radio channel. In one non-limiting example, the scheduler 30 selects for each transmission time interval (TTI) the mobile user having the highest CQI for each beam group. The shared channel transmissions to each selected mobile via its corresponding antenna beam occur in this non-limiting example two TTI's after the CQI's are reported.

The scheduler 30 also monitors the available channel resources 32 and employs some type of resource allocation method for allocating resources for each antenna beam transmission for each transmission time interval. One possible method is "round robin" scheduling where resources are scheduled sequentially. A round robin algorithm can be applied per beam. Users are regrouped per set with each set corresponding to a specific beam. The round robin scheduler is applied to each set so that mobile users in each set are scheduled in a time-multiplexed fashion. Another example scheduling method is to divide the shared channel radio resources evenly between the selected multiple mobile radios.

Yet another example shared channel resource allocation scheme is to divide the shared radio channel resources in proportion to each mobile radio's reported detected channel quality. A well-known "water filling" algorithm may be used to implement this particular allocation scheme. Still further, the resources may be divided using a non-linear relationship between two or more parameters such as the following: channels, power, throughput, quality of service, detected channel quality, etc. Regardless of the resource allocation scheme employed, an optimal coding and modulation scheme is preferably also selected for each scheduled mobile radio in order to achieve an acceptable error rate.

Using a wideband-CDMA system as an example context for resource allocation, the radio channel resources include scrambling codes. Each scrambling code has an associated channelization code tree. One example shared channel resource allocation scheme allocates a single scrambling code to the shared radio channel. One or more different channelization codes from the single scrambling code tree are allocated to each antenna beam for use during the predetermined transmission time interval. Alternatively, multiple different scrambling codes may be allocated for each beam during the predetermined transmission time interval. Using multiple scrambling codes as compared to a single scrambling code for the shared radio channel resources increases the intra-cell interference, but also ensures stable spatial and temporal interference patterns in the cell without degrading the system throughput. In this way, the flashlight effect is mitigated, and system performance is considerably improved.

Figure 9:
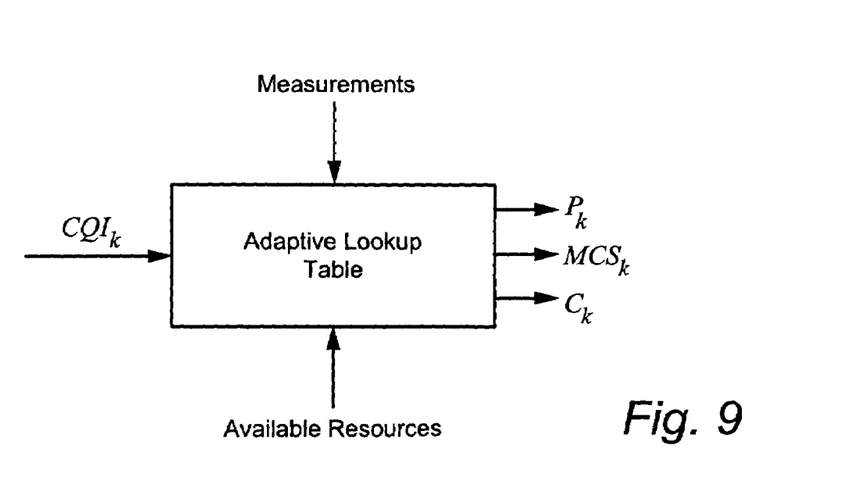
FIG. 9 illustrates an adaptive lookup table that may be employed in the base station illustrated in FIG. 7.

As mentioned above, a nonlinear relationship may be used to divide the shared channel resources. An example follows. If the signal-to-noise ratio (SNR) decreases by 50% due to poor channel conditions, the number of channelization codes or scrambling codes needed to compensate varies depending on the current quality of service requirements. For a higher quality of service, the number of codes may need to increase by 75% to offset the 50% decrease in channel condition. FIG. 9 shows an example where a nonlinear relationship is defined using an adaptive lookup table 34. The CQI's reported from the mobile stations, the available shared channel resources, and one or more measurements are received as inputs. Example measurements may include, for example, mobile user location, mobile speed, throughput, etc. The throughput is a function of the number of channelization codes or scrambling codes allocated to a particular mobile user, but it also depends upon the current radio channel conditions. The output of the adaptive lookup table 34 includes a power $P_k$, a modulation and coding scheme MSC, and scrambling and channelization codes C. The lookup table 34 is preferably constructed to associate the received CQI with the least amount of system resources to ensure a high throughput.

Preferably, the lookup table 34 is dynamically updated to match the current radio channel conditions. One method for deriving an optimal lookup table is based on "reinforcement learning" where for each action taken, e.g., a code allocation, an award is given. Reinforcement learning populates the lookup table by maximizing a numerical reward signal. At a high level, a reinforcement learning controller faces a problem and must learn the behavior of the system through trial and error interactions with the dynamic environment in order to maximize performance. One way is to use statistical techniques including information feedback and dynamic programming methods to estimate the utility of taking certain actions in that environment. The controller knows its current state and performs a number of actions in each state, e.g., deciding the MCS number, power level, etc.

Figure 8:
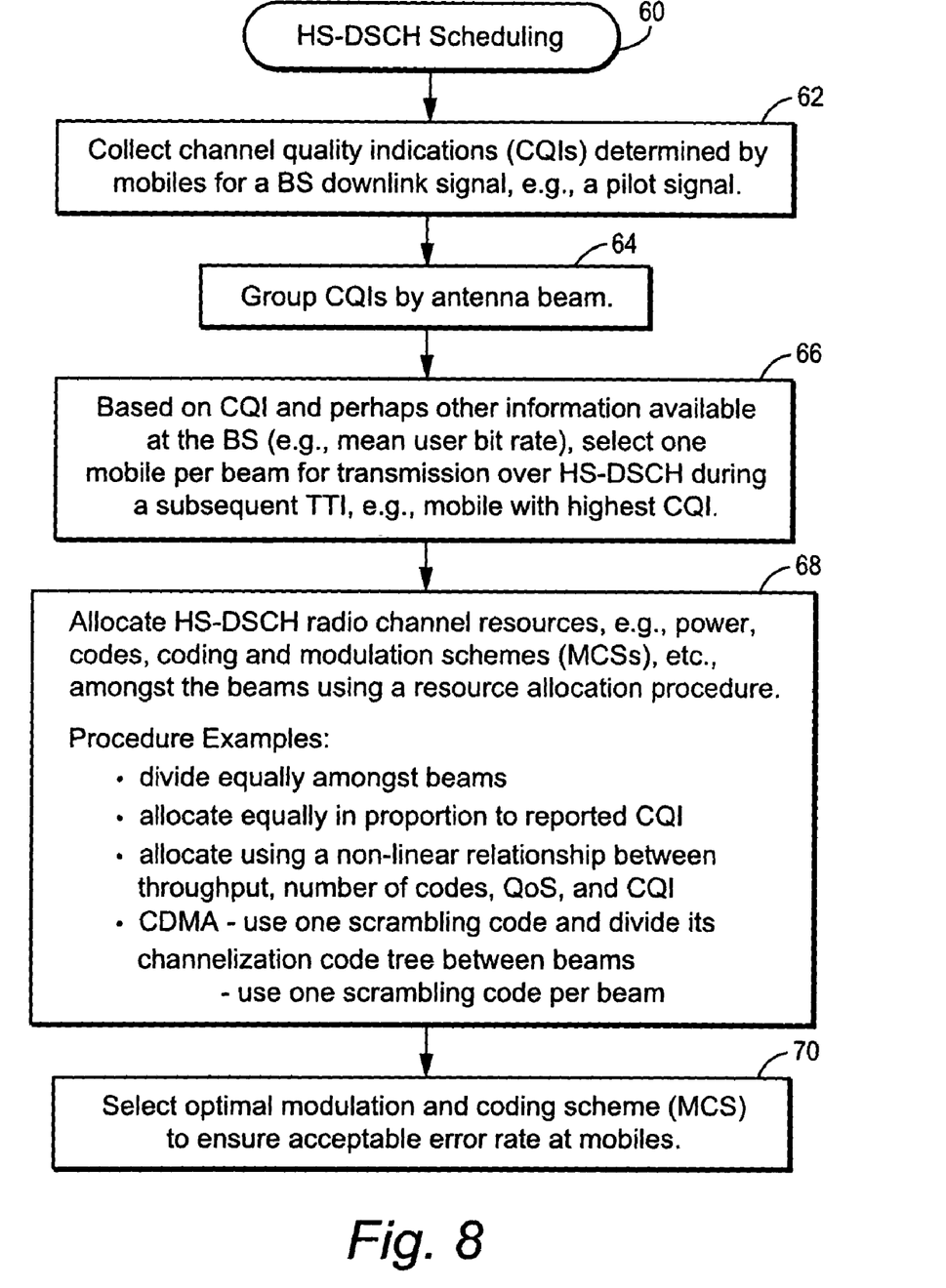
FIG. 8 is a flow chart illustrating procedures involved in certain aspects of the present invention as applied to the example system shown in FIG. 7.

Reference is made to the HS-DSCH scheduling routine (block 60) shown in flowchart form in FIG. 8. CQI's determined by various mobiles for a base station downlink signal, e.g., pilot signal, are collected by the base station (block 62). The channel quality controller 36 groups the CQI's by antenna beam (block 64). Based upon the CQI, and perhaps other information available at the base station, (e.g., mean user bit rate), the scheduler 30 selects one mobile per beam for transmission over the HS-DSCH during a subsequent TTI (block 66). As explained above, one scheduling technique selects the mobile station per beam with the highest reported CQI. The scheduler 30 allocates HS-DSCH radio channel resources for this each interval beam transmission using a resource allocation procedure. Example allocation procedures include: dividing the resources equally amongst the beams, allocating resources in proportion to reported CQI, and allocating using a non-linear relationship (block 68). For any resource allocation procedure, it is desirable to select an optimal modulation and coding scheme (MSC) (if one can be selected) to ensure an acceptable error rate at the mobile (block 70).

Figure 10A:
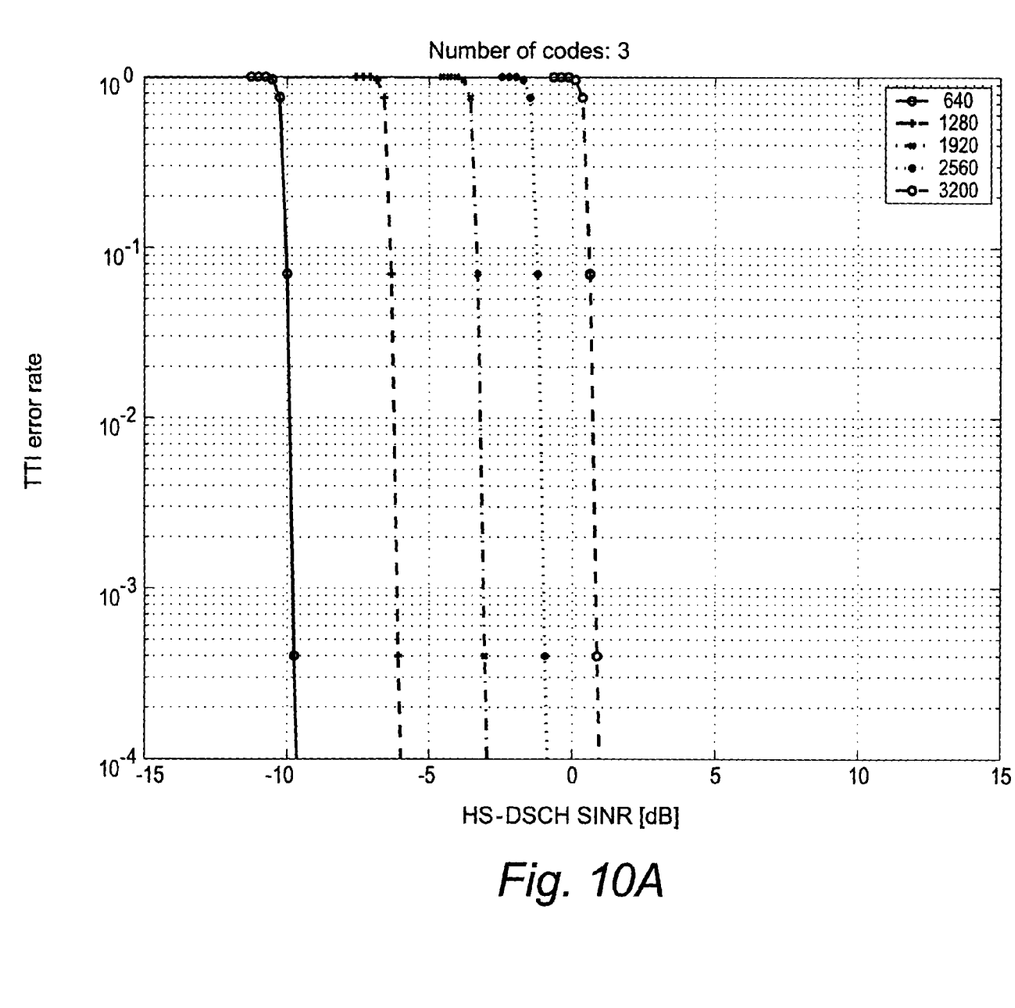
FIGS. 10A-10C are graphs illustrating performance of a multi-beam transmission over the HS-DSCH.
Figure 10B:
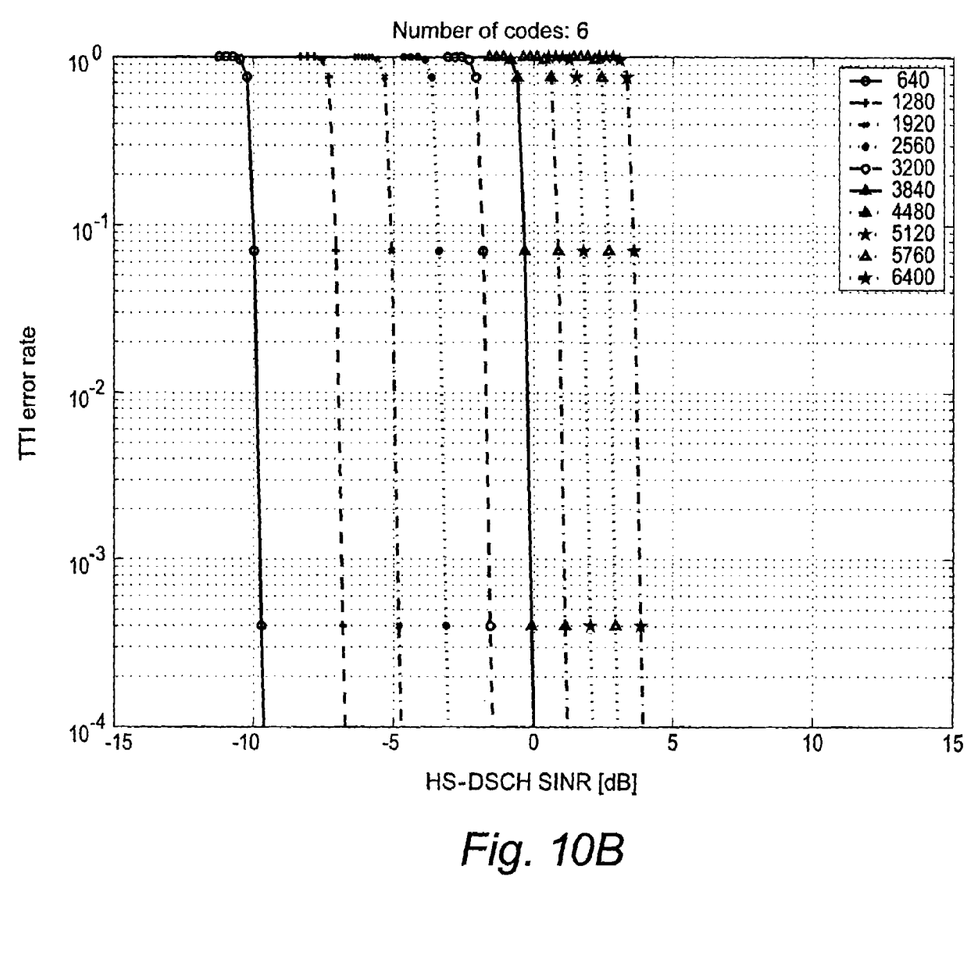
Figure 10C:
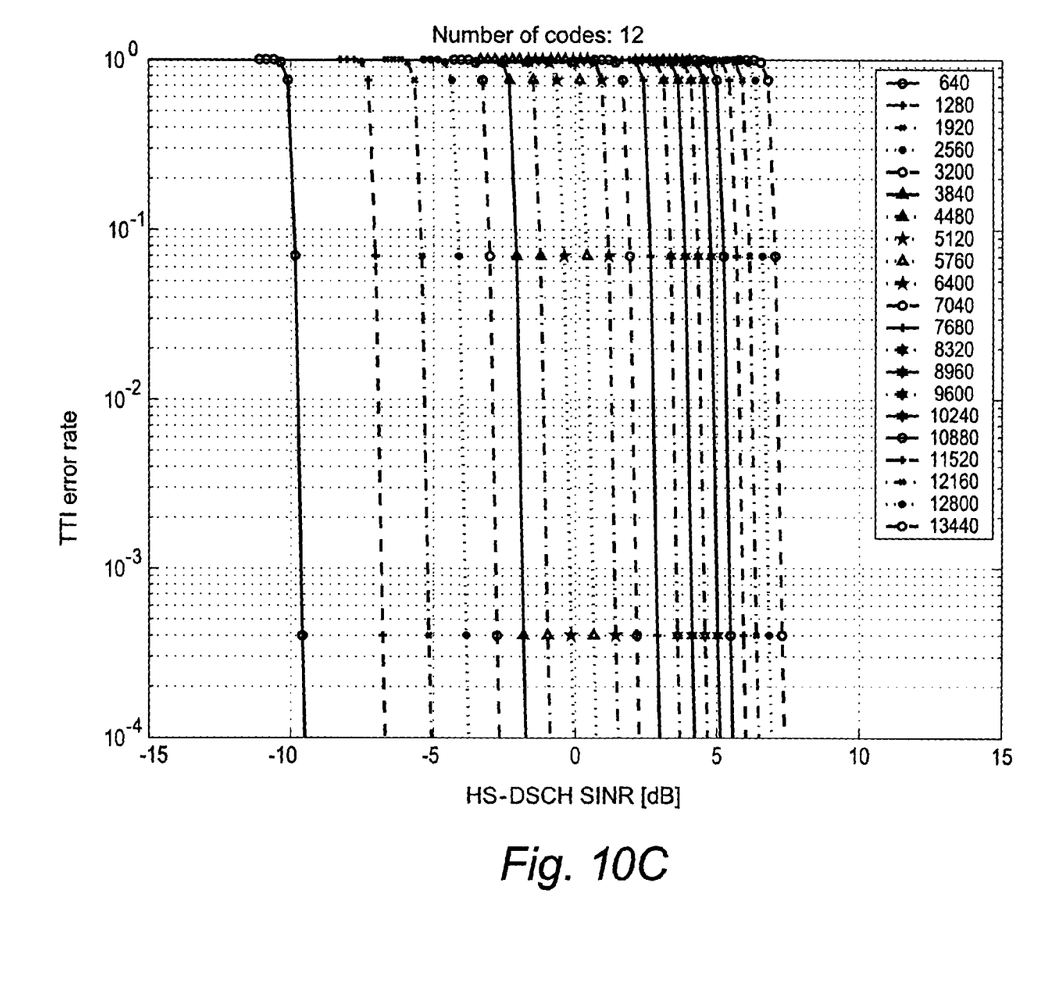

FIGS. 10A-10C illustrate the frame or block error rate (FER) versus the signal-to-interference-plus-noise ratio (SINR) for various allocated codes (12, 6, and 3) and for different numbers of data bits per TTI (here the TTI is 2 ms). These data bits are indicated in the figure legends. TFRC in these figures corresponds to CQI. The figures show the non-linear relation between the SINR, FER, and the data rate. A disadvantage with using six or three codes instead of 12 codes is the loss of granularity of the switching points of different TFRCs. In fact within a given range of SINR, fewer choices of TFRC are offered.

The inventors performed simulations using two different types of radio propagation models to test the performance of the invention in one implementation (i.e., a closed loop mode I transmit diversity). One channel model called a "pedestrian A" channel with relatively little scattering and reflection. The other channel model called an "urban" channel contains considerably more scattering and reflection. Assuming a reference or comparison point a single sector beam to transmit to one "best" mobile user, the simulated implementation for the invention achieved a 50% capacity gain for the pedestrian channel and approximately a 15% capacity gain for the typical urban channel.

Unfortunately, splitting the resources amongst multiple beams during one TTI lowers the peak bit rate because the transmit power per beam largely impacts the achievable bit rate. The highest peak bit rate is achieved by allocating all transmit power resources to one beam in a cell. However, as already described above, a single beam allocation—without careful planning—causes the flashlight effect. But by carefully planning in space and/or in time which beam is used for transmission, the flashlight effect may be avoided.

For example, each cell can be allocated a beam transmission sequence order using a list that gives the order of beams to be used for transmission. Mobile users belonging to this beam may be scheduled. The beam selection is decided using a beam sequence number. For example, in FIG. 2, assuming that beam 1 is the left-most beam and beam 5 the right-most beam seen from the base station, a simple beam transmission list could be {B1, B2, B3, B4, B5}. The beams are switched more slowly, e.g., not every TTI but rather over multiple TTIs. If there are HS-DSCH cells geographically opposite to each other, it is desirable to have the beam sequences be as orthogonal as possible to lower the probability of transmitting simultaneously on the opposite beam belonging to different cells. It is also desirable to avoid synchronization in the network in order to decrease the frequency of beam switching (e.g., occurs with a slower time interval than a TTI (e.g., a multiple of 2 ms)). This results in a more reliable/stable CQI measurement. This beam transmission sequencing approach mitigates the flashlight effect by switching beams more slowly than usual so that the interference stays constant over several intervals. At the same time, this beam sequencing approach permits high peak bit rates and provides improved overall system performance.

The present invention includes any spatial and/or temporal interference management scheme that eliminates the flashlight effect. By selecting an optimal resource allocation procedure, higher downlink system throughput and overall system performance are substantially improved. Smoother interference variations are introduced artificially in the network to ensure a stable network and much easier interference prediction. The invention may be applied to various antenna techniques such as beam-forming, transmit diversity, etc.

The invention has been described in connection with what is presently considered to be the most practical and preferred embodiments. The invention is not limited to the disclosed embodiments. The invention is applicable whenever multiple antenna beams are employed for a transmission over a radio channel including diversity transmission schemes. The invention can by applied to other various advanced antenna techniques, for instance, steered beams, closed loop transmit diversity, and situations where the mobile station instructs the base station on a beam weight to be used. Indeed, the present invention may be employed with transmission schemes in which signals are sent with different polarizations. The invention covers various modifications and equivalent arrangements included within the scope of the appended claims.

The invention claimed is:

1. A method for use in a radio communications system with a radio base station that includes multiple antennas associated with a cell, comprising:

selecting multiple mobile radios to receive a transmission over a shared radio channel during a predetermined transmission time interval, and transmitting information over the shared radio channel to the multiple mobile radios in the cell during the predetermined transmission time interval using multiple antenna beams so that interference from the transmission appears as white noise in time and in space such that interference from the transmission is substantially equally distributed over frequency and in space, wherein the transmitting to the multiple mobile radios in the cell during the predetermined transmission time interval using multiple antenna beams prevents a flashlight effect from disrupting the channel quality detection performed by the mobile radios, and wherein the flashlight effect is an intense interference detected by a first mobile radio flashed by a beam transmission on the shared radio channel during one of the predetermined time intervals to another scheduled mobile radio thereby causing the first mobile radio to report a lower signal quality value for shared radio channel during the one predetermined time period, and wherein the flashlight effect negatively impacts scheduling on the shared radio channel because the first mobile radio reports the lower signal quality value for the shared radio channel which is substantially different than an actual signal quality value for the shared radio channel during the one predetermined time period as a result of the first mobile radio being flashed by a beam transmission.

2. The method in claim 1, wherein the white noise is white additive Gaussian noise and one mobile radio is selected for one of the antenna beams.

3. The method in claim 1, wherein the shared radio channel is a high speed-downlink shared channel (HS-DSCH).

4. The method in claim 3, further comprising:
receiving reports from mobile radios of a detected channel quality of a pilot signal transmitted in the cell, and
scheduling transmissions to multiple mobile radios over the HS-DSCH for each transmission time interval based on the received reports.

5. The method in claim 4, further comprising:
selecting one of the mobile radios to receive a transmission from one of the antenna beams based on the received reports, and
transmitting the information over the HS-DSCH using each antenna beam to each selected mobile radio during the predetermined share time interval.

6. The method in claim 4, further comprising:
selecting an optimal coding and modulation scheme for each scheduled mobile radio to achieve an acceptable error rate.

7. The method in claim 1, further comprising:
splitting shared radio channel resources among the multiple mobile radios using a resource allocation scheme.

8. The method in claim 7, wherein the radio communications system is a CDMA-based system where radio channel resources include scrambling codes, each scrambling code having an associated channelization code tree, and wherein the resource allocation scheme allocates a scrambling code to the shared radio channel and allocating one or more different channelization codes associated with the shared radio channel scrambling code to each antenna beam during the predetermined transmission time interval.

9. The method in claim 7, wherein the radio communications system is a CDMA-based system where radio channel resources include scrambling codes, each scrambling code having an associated channelization code tree, and wherein the resource allocation scheme allocates a different scrambling code for each antenna beam during the predetermined transmission time interval.

10. The method in claim 7, wherein the resource allocation scheme divides the shared radio channel resources evenly between the multiple mobile radios.

11. The method in claim 7, wherein the resource allocation scheme divides the shared radio channel resources in proportion to each mobile radio's reported detected channel quality.

12. The method in claim 7, wherein the resource allocation scheme divides the shared channel resources using a non-linear relationship between two or more of the following: amount of channel resources, throughput, quality of service, and detected channel quality.

13. The method in claim 12, wherein the non-linear relationship is stored in a look-up table.

14. The method in claim 13, further comprising:
detecting a change in radio channel conditions, and
updating the look-up table based on changed radio channel conditions.

15. A radio base station for use in a radio communications system, comprising:
an adaptive antenna array including multiple antennas associated with a cell for generating multiple antenna beams, each beam covering only a portion of the cell;
one or more transmit buffers;
a channel scheduler for selecting multiple mobile radios to receive a transmission over a shared radio channel during a predetermined transmission time interval; and
transceiving circuitry for transmitting information stored in the one or more transmission buffers over the shared radio channel via the adaptive antenna array to the multiple mobile radios in the cell during the same predetermined transmission time interval using multiple antenna beams to spread out the interference caused by the transmission so that interference from the transmission is substantially equally distributed over frequency and in space wherein the transmission via the adaptive antenna array to multiple mobile radios in the cell during the predetermined transmission time interval using multiple antenna beams prevents a flashlight effect from disrupting the channel quality detection performed by the mobile radios, wherein the flashlight effect is an intense interference detected by a first mobile radio flashed by a beam transmission on the shared radio channel during one of the predetermined time intervals to another scheduled mobile radio thereby causing the first mobile radio to report a lower signal quality value for shared radio channel during the one predetermined time period, and wherein the flashlight effect negatively impacts scheduling on the shared radio channel because the first mobile radio reports the lower signal quality value for the shared radio channel which is substantially different than an actual signal quality value for the shared radio channel during the one predetermined time period as a result of the first mobile radio being flashed by a beam transmission.

16. The radio base station in claim 15, wherein the interference from the transmission appears as white noise in time and in space in the cell and one mobile radio is selected for one of the antenna beams.

17. The radio base station in claim 16, wherein the white noise is white additive Gaussian noise.

18. The radio base station in claim 15, wherein the radio channel is a high speed-downlink shared channel (HS-DSCH).

19. The radio base station in claim 18, further comprising:
a channel quality controller for receiving reports from mobile radios of a detected channel quality of a pilot signal transmitted in the cell,
wherein the scheduler is configured to schedule transmissions to multiple mobile radios over the HS-DSCH for each transmission time interval based on the received reports.

20. The radio base station in claim 19, wherein the scheduler is configured to select one of the mobile radios to receive a transmission from one of the antenna beams based on the received reports, and
   wherein the transceiving circuitry is configured to transmit the information over the HS-DSCH using each antenna beam to each selected mobile radio during the predetermined transmission time interval.

21. The radio base station in claim 15, wherein the scheduler is configured to select an optimal coding and modulation scheme for each scheduled mobile radio to achieve an acceptable error rate.

22. The radio base station in claim 21, wherein the radio communications system is a CDMA-based system where radio channel resources include scrambling codes, each scrambling code having an associated channelization code tree, and wherein the resource allocation scheme includes transmission allocating a different scrambling code for each antenna beam during the predetermined time interval.

23. The radio base station in claim 21, wherein the resource allocation scheme includes dividing the shared radio channel resources evenly between the multiple mobile radios.

24. The radio base station in claim 21, wherein the resource allocation scheme includes dividing the shared radio channel resources in proportion to each mobile radio's reported detected channel quality.

25. The radio base station in claim 21, wherein the resource allocation scheme includes dividing the shared channel resources using a non-linear relationship between two or more of the following: amount of channel resources, throughput, quality of service, and detected channel quality.

26. The radio base station in claim 25, wherein the non-linear relationship is stored in a look-up table.

27. The radio base station in claim 26, wherein the scheduler is configured to: detect a change in radio channel conditions, and
   update the look-up table based on changed radio channel conditions.

28. The radio base station in claim 15, wherein the scheduler is configured to split radio resources of the shared radio channel among the multiple mobile radios using a resource allocation scheme.

29. The radio base station in claim 28, wherein the radio communications system is a CDMA-based system where radio channel resources include scrambling codes, each scrambling code having an associated channelization code tree, and wherein the resource allocation scheme includes allocating a scrambling code to the shared radio channel and allocating one or more different channelization codes associated with the shared radio channel scrambling code to each antenna beam during the predetermined transmission time interval.

30. The radio base station in claim 15, wherein the multiple antennas include an adaptive antenna array.

31. The radio base station in claim 15, wherein the multiple antennas include transmit diversity antennas.

32. A method for use in a radio communications system with a radio base station that includes multiple antennas associated with a cell, comprising:
   selecting mobile radios to receive a transmission over a shared radio channel using a beam transmission sequence order;
   transmitting information over the shared radio channel using one beam to one or more mobile radios following the beam transmission sequence order for multiple predetermined time intervals;
   performing beam switching in accordance with the beam transmission sequence order after multiple transmission time intervals so that the flashlight effect is avoided,
   receiving reports from mobile radios of a detected channel quality of a pilot signal transmitted in the cell; and
   scheduling transmissions to one of the mobile radios over the shared radio channel for more than one transmission time interval in accordance with the beam transmission sequence based on the received reports,
   wherein the flashlight effect is an intense interference detected by a first mobile radio flashed by a beam transmission on the shared radio channel during one of the predetermined time intervals to another scheduled mobile radio thereby causing the first mobile radio to report a lower signal quality value for the shared radio channel during the one predetermined time period, and wherein the flashlight effect negatively impacts scheduling on the shared radio channel because the first mobile radio reports the lower signal quality value for shared radio channel which is substantially different than an actual signal quality value for the shared radio channel during the one predetermined time period as a result of the first mobile radio being flashed by a beam transmission.

33. The method in claim 32, wherein the interference from the transmission appears as white noise in time and in space.

34. The method in claim 33, wherein the shared radio channel is a high speed-downlink shared channel (HS-DSCH).

* * * * *